US010756922B2

(12) United States Patent
Doerner et al.

(10) Patent No.: US 10,756,922 B2
(45) Date of Patent: Aug. 25, 2020

(54) EXTERNAL COMMUNICATIONS MODULE FOR HOUSEHOLD DEVICES (71) Applicant: BSH HAUSGERAETE GMBH, Munich (DE)

(72) Inventors: Jan Philipp Doerner, Munich (DE); Niels Kuschinsky, Munich (DE); Nick Flohrer, Munich (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 16/098,939

(22) PCT Filed: Apr. 11, 2017

(86) PCT No.: PCT/EP2017/058656
§ 371 (c)(1),
(2) Date: Nov. 5, 2018

(87) PCT Pub. No.: WO2017/190922
PCT Pub. Date: Nov. 9, 2017

(65) Prior Publication Data
US 2019/0097833 A1 Mar. 28, 2019

(30) Foreign Application Priority Data
May 3, 2016 (DE) .................... 10 2016 207 601

(51) Int. Cl.
*H04L 12/28* (2006.01)
*G05B 23/02* (2006.01)
(Continued)

(52) U.S. Cl.
CPC ...... *H04L 12/2825* (2013.01); *G05B 23/0213* (2013.01); *G05B 23/0224* (2013.01);
(Continued)

(58) Field of Classification Search
CPC .................................. G05B 1/00; H04W 4/00
See application file for complete search history.

(56) References Cited

U.S. PATENT DOCUMENTS 10,012,971 B2    7/2018  Pietsch et al.
2016/0033568 A1*  2/2016  Tsao ................... G01R 31/2825
                                                         702/64
(Continued)

FOREIGN PATENT DOCUMENTS

DE    10214794 A1 *  1/2004  ......... A47L 15/4293
DE    10214794 A1     1/2004
(Continued)

*Primary Examiner* — Shirley Lu
(74) *Attorney, Agent, or Firm* — Laurence A. Greenberg; Werner H. Stemer; Ralph E. Locher (57) ABSTRACT

A communications module for a household device includes a sensor device that is configured to be attached in the region of a device housing of the household device, a wireless data interface and a processor. The sensor device is configured to scan an emission signal, penetrating outwards through the device housing, of a component of the household device carrying out the operating process of the household device. The processor is configured to determine an operating state of the household device based on measurement values of the sensor device and to provide same by means of the data interface. In addition, the communications module can be used optionally in different types of household devices.

10 Claims, 3 Drawing Sheets (51) Int. Cl.
*H04W 4/38* (2018.01)
*G08B 21/18* (2006.01)
*H04L 29/08* (2006.01)
*H04W 4/021* (2018.01)

(52) U.S. Cl.
CPC ........ *G08B 21/182* (2013.01); *H04L 12/2823* (2013.01); *H04L 67/12* (2013.01); *H04W 4/021* (2013.01); *H04W 4/38* (2018.02); *H04L 2012/285* (2013.01); *H04L 2012/2841* (2013.01)

(56) References Cited

U.S. PATENT DOCUMENTS

2016/0231723 A1* 8/2016 Pietsch .............. A47L 15/0063
2017/0208426 A1* 7/2017 Komoni ................ G08C 17/02

FOREIGN PATENT DOCUMENTS

| DE | 102007058936 A1 * | 6/2009 | ............... G01H 1/06 |
| DE | 102007058936 A1 | 6/2009 | |
| WO | 2008003572 A2 | 1/2008 | |
| WO | WO-2008003572 A2 * | 1/2008 | ......... H01H 36/0066 |
| WO | 2015036229 A1 | 3/2015 | |

\* cited by examiner

EXTERNAL COMMUNICATIONS MODULE FOR HOUSEHOLD DEVICES

BACKGROUND OF THE INVENTION

Field of the Invention

The invention relates to a communication module. The invention relates in particular to a communication module which can be retrofitted on the outer side of a household appliance.

A washing machine is designed to implement a predetermined program to clean a laundry load. The execution of the program is often dependent on parameters which are not yet known at the beginning of the program sequence, for example a degree of soiling of the laundry. During its operation, the washing machine can display an expected remaining runtime of the washing program by way of an optical display. Some modern washing machines are equipped with data interfaces to enable transmission of their operating state to a remote device. For example, a user can be in another room and can be informed by means of wireless data transmission about the progress or an end of the program sequence. However, a washing machine of an older year of manufacture often does not have such an interface via which information can be provided to the outside.

WO 2015/036229 A1 relates to determining an operating state of a household appliance based on measured values of a magnetic field sensor which is attached to the outer side of the household appliance. The magnetic field sensor permits only a relatively rough determination of the operating state and is restricted to use on a household appliance which emits significant magnetic emissions.

SUMMARY OF THE INVENTION

It is an object of the present invention to provide an improved communication module, a system and a method which make it possible to detect an operating state of a household appliance in terms of data. The invention achieves this object by means of the subject matters of the independent claims. Subclaims specify preferred embodiments.

An inventive communication module for a household appliance comprises a sensor device which is designed to be attached in the region of a housing of the household appliance, a wireless data interface and a processing device. The sensor device is designed to scan an emission signal, which passes through the appliance housing to the outside, of a component of the household appliance carrying out the operating process of the household appliance, and the processing device is designed to determine an operating state of the household appliance on the basis of measured values of the sensor device, and to provide it by means of the data interface. In this case, the communication module can optionally be used on different types of household appliance.

It is possible to use the communication module successively on different household appliances, for example depending on which household appliance is currently being operated. For instance, the communication module can therefore usually be attached to a refrigerator in order to continuously monitor the operating state thereof, and, if required, shifted to a dishwasher, for example when the latter is being operated while no people are in the household. The function of the communication module can therefore be flexibly and simply adapted to a current information requirement of a user.

The communication module can be adapted, for example manually, to the type of household appliance on which it is to be used. For this purpose, an input device can be provided on the communication module, via which input device the type of household appliance can be input. In a further embodiment a coding can be attached to the household appliance, and the communication module scans this in order to determine the type of household appliance. This coding can be attached manually, for example, and can comprise a character code such as a bar code, an optical matrix (such as, for example, a QR code) or a point code, which can be optically scanned by the communication module.

In a particularly preferred embodiment the processing device of the communication module is designed to determine the type of household appliance on the basis of measured values of the sensor device. The handling of the communication module, in particular when changing from one household appliance to another, can be simplified as a result. A faulty configuration by a user can be ruled out. Preparation of a household appliance in order to be able to use the communication module on it can be omitted.

In one embodiment predetermined emissions respectively are associated with a plurality of predetermined types of household appliance. The processing device of the communication module is designed to compare measured values, which are scanned by means of the sensor device during operation of the household appliance, with predetermined emissions in order to determine on which type of household appliance the communication module is used. For example, a first type of household appliance can comprise a washing machine and a second type a refrigerator. If the sensor device is designed to receive a magnetic alternating field of a motor of the household appliance, the relatively weak and conventionally periodic operating phases of a cooling compressor of the refrigerator can be easily distinguished from the more intensive and longer-lasting operating phases of a drive or centrifugal motor of the washing machine. As a result, the type of household appliance can be determined quickly and reliably. The operating state of the household appliance of the particular type can be determined with improved accuracy. The emissions can therefore be predetermined in such a way that they each relate to a predetermined type of household appliance or to a group of household appliances of the same type. If the household appliance is, for example, of the tumble dryer type, a distinction can therefore be made between a simple tumble dryer and one with a heat pump on the basis of the predetermined emissions. A finer resolution, which indicates a particular model of the household appliance, is likewise possible. The predetermined emissions can be stored in the communication module or can be wirelessly transmitted if required. For this purpose, a repository of pre-determined emissions and respectively associated household appliances can be provided.

In a further embodiment the communication module is designed to shift at least one of its components from a power-saving mode to an operating mode when the emission signal scanned by means of the sensor device indicates a change in the operating state of the household appliance. For example, the sensor device can be used to periodically check whether the household appliance is in operation or not. Only when it is in operation or when its operating state changes, can for example, the wireless data interface of the communication module be shifted into an operating mode from a power-saving mode. The operating mode enables the transmission of the particular operating state and can be ended again after the transmission thereof. The power-saving mode can enable only a partial functionality or completely switch off the component. For example, the processing device can support different power-saving modes, wherein the performance or reaction speed of the processing device in the respective mode can be correlated with the power consumption. By supporting a power-saving mode on one or more component(s), the communication module can be operated for a relatively long time without replacing an energy source such as a battery or charging an accumulator. A continuous service life of the communication module can therefore be increased and can reach durations of several weeks or several months.

In particular, it is preferred that the communication module comprises a further sensor device for scanning a further emission signal of the household appliance, with the processing device being adapted to determine the operating state on the basis of measured values of both sensor devices. In further embodiments more than two different sensor devices can also be provided. The sensor devices can scan the same type of emissions, for example magnetic fields, in different ways, for instance at different locations of the household appliance, or different types of emission, for example acoustic, optical, thermal or kinetic emissions. By simultaneously observing a plurality of emissions, an improved determination of the type of household appliance or of the operating state can be implemented. Interference signals from an environment of the household appliance can be compensated or filtered out in an improved manner. Particular characteristic processes of the household appliance, which indicate the operating state, can be detected in an improved manner. Therefore, for instance, the opening of a door of the household appliance can be determined on the basis of a vibration, an acceleration, a noise, a change in the magnetic emission or a combination of these emissions.

The further sensor device or one of a plurality of sensor devices of the communication module can be adapted to scan a region on the outer side of the appliance housing for a measurable variable which can be determined in connection with the operating process of the household appliance. As a result, in particular disturbances in the region of the household appliance can be determined in an improved manner. If, for instance, water is detected standing or running in the floor area around a dishwasher, this can indicate a functional defect of the household appliance. If extraordinarily high temperatures are detected above or next to a cooker, these can indicate a room fire which can be caused by the use of the cooker. It can be determined in an improved manner whether there is a risk in the region of the household appliance and possibly also in what manner this can be combatted.

The further sensor can in particular comprise a VOC sensor (VOC: volatile organic compound). The VOC sensor can determine a series of substances dissolved in the air which can provide further information on the operating state of the household appliance. Therefore, by means of this sensor it is possible to determine, for instance, whether coffee in a coffee machine is still fresh, damp laundry in a washing machine is beginning to develop mold spots, or whether perishable foodstuffs are stored in a refrigerator.

The operating state of the household appliance can in particular comprise the progress of a program relating to an expected program end. In other words, the processing device of the communication module can be designed to provide, via the data interface, information about an expected remaining operating duration, a program duration or an operating duration already expired within an operating program.

In yet a further embodiment the operating state comprises an energy consumption of the household appliance. Therefore, a user can better decide at which point in time he puts a different, in particular energy-intensive, household appliance into operation. Simultaneous operation of a plurality of household appliances having a high energy requirement can consequently be avoided. The more uniform energy consumption of the household can result in environmental or cost advantages.

In yet a further embodiment the processing device is designed to send a notification when a predetermined operating state of the household appliance is reached. The notification can relate, for example, to the termination of the operating program or the occurrence of a fault in the household appliance. The notification can be sent in particular as a digital message to a computer or a smartphone of a user of the household appliance. A plurality of messages can also be transmitted in order to reach at least one of several people who can influence the household appliance or the surrounding household.

A further aspect of the invention relates to a system comprising the above-described communication module and a mobile device having a wireless data interface for receiving the determined operating state of the household appliance from the communication module. The mobile device is designed to output a warning, when it is removed from a predetermined region of the household appliance while the household appliance is in operation. The region can comprise the household and the position of the mobile device can be effected by means of a positioning device of the appliance.

A user who leaves the household with the mobile device can therefore be reminded that a household appliance is still in operation. In a further embodiment, the warning can only be output when the determined operating state of the household appliance indicates an imminently required or advisable operation by the user. If, for example, a washing machine approaches the end of its operating program, it is expedient to wait until the end of the program and to then remove the wet laundry from the washing machine and dry it in order to avoid mold spots on the laundry. The user can actively be informed as to how long the operating program is likely to last. A dangerous state of a household appliance operating unsupervised can be avoided in this way.

The system can also comprise a plurality of communication modules, with the operating states of all household appliances being determined by means of the communication modules when the mobile device leaves the predetermined range in order to determine whether the household can be safely left. The user can therefore collectively determine during or even before leaving the household whether all household appliances are in safe states and it is safe to leave the household.

A method for determining an operating state of a household appliance comprises steps of scanning an emission signal, which passes through the appliance housing to the outside, of a component carrying out the operating process of the household appliance; determining the type of household appliance on the basis of measured values of the sensor device; determining the operating state on the basis of measured values of the sensor device and the particular type; and providing the determined operating state.

It is preferred that the emissions are processed by means of a processing device of the communication module described above. However, processing can also be carried out by means of a server or a further central component to which the scanned emissions can be transmitted. Processing of the emissions can comprise determination of the household appliance and/or determination of the operating state.

The invention has been described with reference to a communication module, a system and a method. Unless stated otherwise, the features explained with reference to the communication module can be applied analogously to the system and the method.

BRIEF DESCRIPTION OF THE SEVERAL VIEWS OF THE DRAWING

The invention will now be described in more detail with reference to the accompanying figures, in which.

DESCRIPTION OF THE INVENTION

Figure 1:
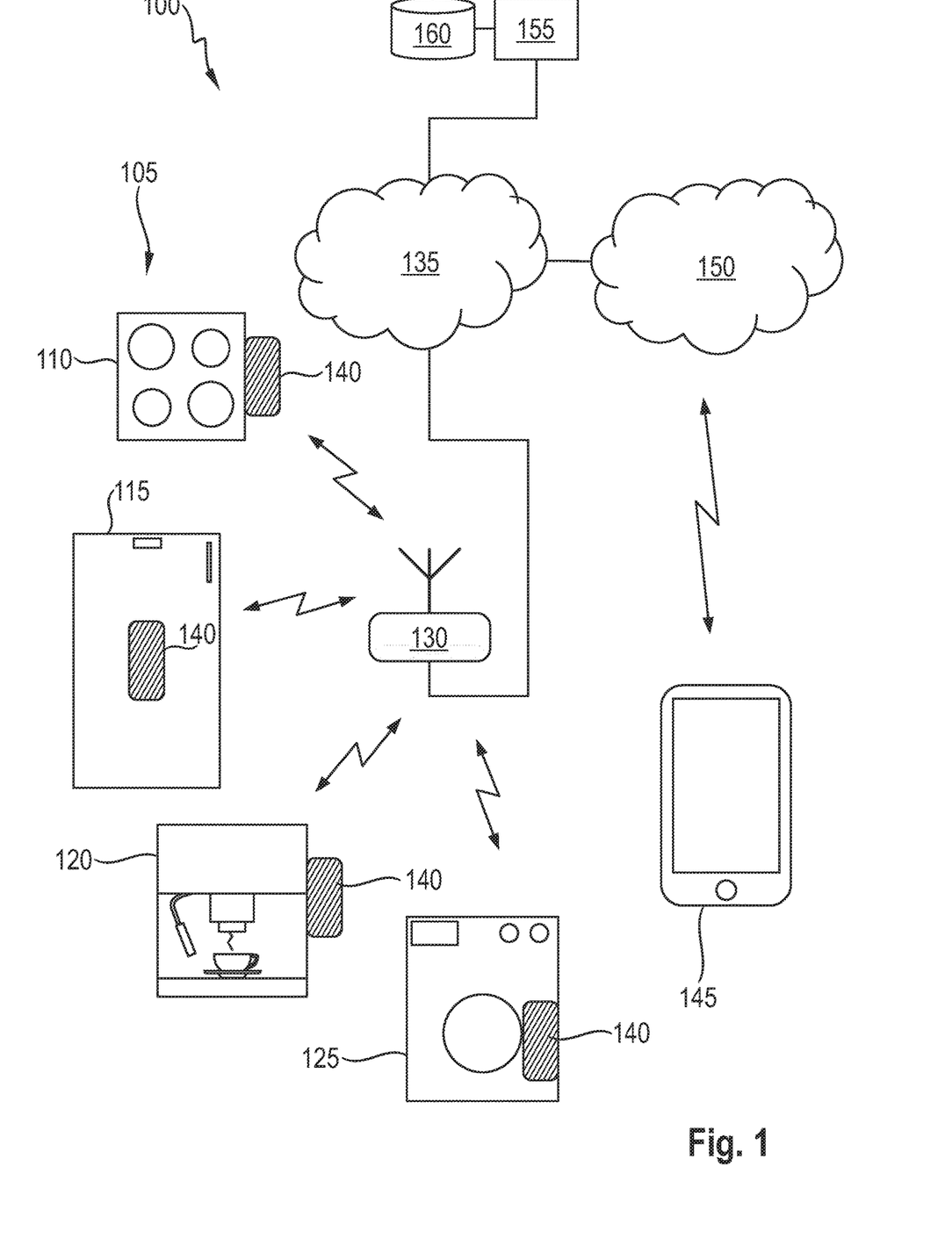
FIG. 1 shows a system comprising a plurality of household appliances.

FIG. 1 shows a system 100 comprising at least one household appliance 105, wherein the household appliances 105 can be arranged in a common household. In this case, several types of household appliance 105 can be used, for example a cooker 110, a refrigerator 115, a coffee machine 120 or a washing machine 125. A network component 130 is preferably provided which enables communication with a network 135, for example the internet. The network component 130 can be designed in particular for wireless communication in the region of the household appliances 105 and in one embodiment comprises a WLAN router. A communication module 140, which is designed to determine an operating state of the respective household appliance and to provide it by means of a wireless data interface, is attached to at least one of the at least one of the household appliances 105. The determined operating state can in particular be wirelessly transmitted to the network component 130 and from there to a further component. For example, a transmission to a mobile device 145, in particular a smartphone or a computer, can occur. The transmission can occur wirelessly directly from the communication module 140, completely or partially wirelessly via the network component 130, optionally via the network 135 and further optionally via a mobile radio network 150. As a result, the mobile device can be used virtually anywhere for monitoring the household appliances 105, and a presence in the same household is not required.

Wireless transmission sections can be overcome using any data radio techniques, for example WLAN, Bluetooth, mobile data radio or NFC. Furthermore, transmission to a central component 155 can occur, which can be achieved in particular via the network component 130. The central component 155 can be designed as a computer server and comprise a data memory 160 for storing the transmitted message. The central component 155 can also be virtualized so reference can be made to a cloud, a cloud-based service or a server in a cloud.

Communications can generally originate from the communications module 140 or from a further component, in particular the mobile device 145 or the central component 155. In one embodiment the communication module 140 can actively send or bring about a notification, for example via the central component 155 to the mobile device 145. The notification is conventionally sent if a predefined condition has occurred, for example if a predefined event, such as a program interruption of a household appliance, has been determined. It is preferable for the mobile device 145 to be designed to handle the required communication and to provide a user with a suitable user interface. For this purpose, a computer program product (also: application, app) can run on the mobile device 145. The computer program product can be specifically adapted to one or more of the task(s) and functionalities presented here.

The communication module 140 is designed to be retrofitted to an outer side of one of the household appliances 105 and to determine an operating state of the household appliance 105 by means of a sensor device on the basis of emissions passing through to the outside. In this case, the communication module 140 is designed to be used selectively on different types of household appliance 105. Monitoring of one or more household appliance(s) 105 or of a complete household can thereby be made possible without laborious and potentially expensive and complex interventions on one of the household appliances 105. The household appliances 105 can be integrated flexibly into the system 100 and the specific operating states can be evaluated in different ways. In one embodiment the household appliances 105 can be monitored, in a further embodiment a user can be notified about a specific operating state or an event concerning a household appliance 105 based thereon, and in yet a further embodiment particular operating states of one or more household appliance(s) 105 can be statistically evaluated, wherein the data can be correlated with each other.

Figure 2:
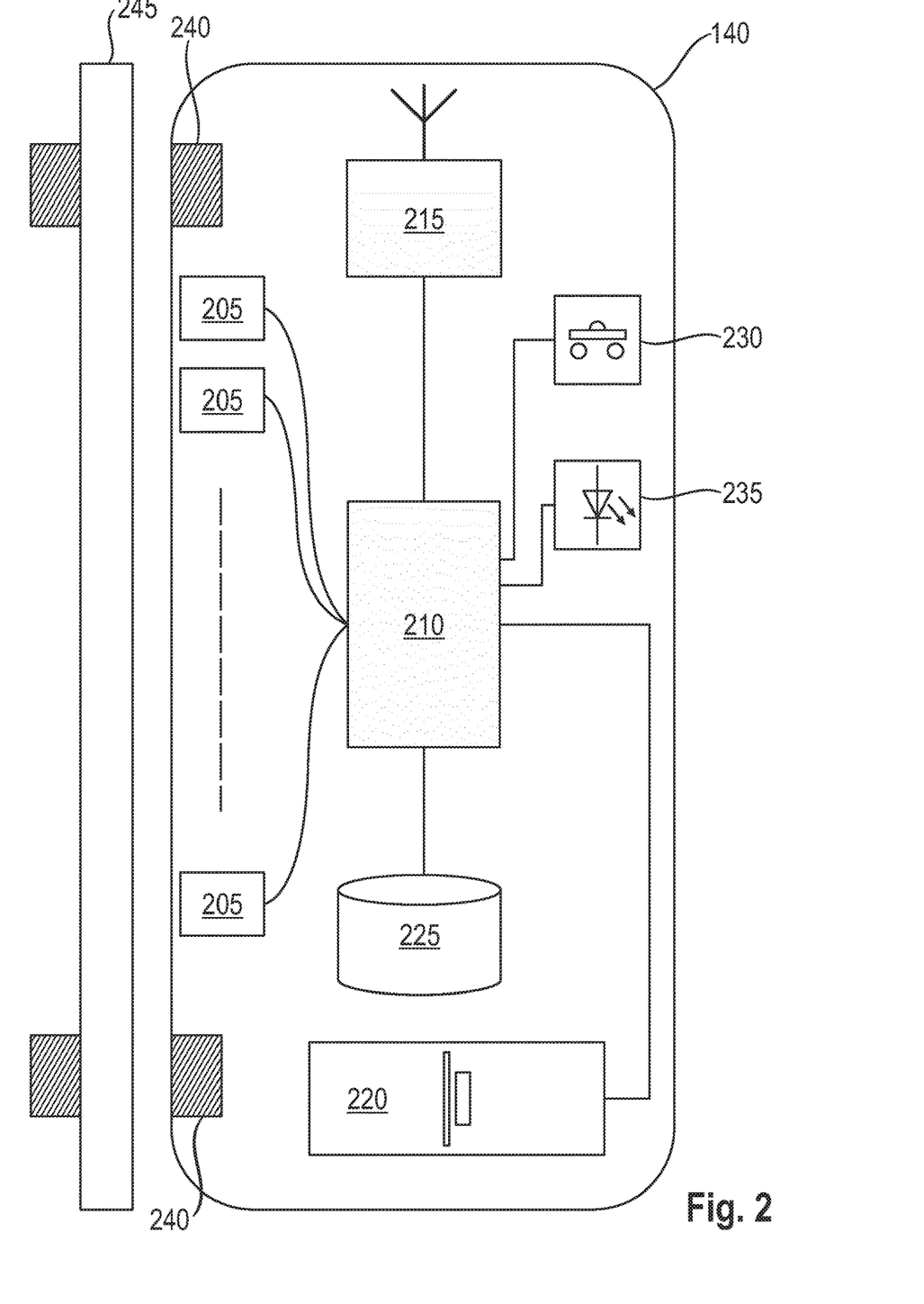
FIG. 2 shows a communication module for use in different types of household appliance.

FIG. 2 shows a communication module 140 of the system 100 of FIG. 1 for use in different types of household appliance 105. The communication module 140 comprises at least one sensor device 205, a processing device 210 and a wireless data interface 215. An energy requirement of the communication module 140 is covered by an energy store 220 such as, for example, a battery or an accumulator. A storage device 225 can optionally be provided. In addition, an input device 230 and/or an output device 235 can be provided in the further embodiments. It is preferred that a fastening mechanism 240 is additionally provided in order to attach the communication module 140 or at least one of the sensor devices 205 to an outer side of a housing of a household appliance 105.

The sensor device 205 is conventionally integrated with the communication module 140. In some embodiments, however, the sensor device 205 can also be used at a predetermined distance from the communication module 140, for example connected by a cable. Only the sensor device 205 can then be attached to the household appliance 105 and the remaining communication module 140 can be mounted in the vicinity, for example on or under the household appliance 105. The communication module can consequently be better designed to scan a region in the environment of the household appliance 105 by means of further sensor devices 205. For example, a trickle or standing water can be determined in the floor area of the household appliance 105 by means of a water sensor.

In one embodiment one of the sensor devices 205 is designed to carry out scanning at a predetermined distance from the communication module 140, for example if the sensor device 205 comprises a camera or an infrared sensor. The communication module 140 can thereby scan the operating process of the household appliance 105 or a direct effect of the operating process on an environment in an improved manner.

The household appliance 105 preferably comprises a housing or appliance housing that is not removed during normal use. If the household appliance 105 comprises a door or a further opening, the latter can be opened or closed during the course of use. An outer side of the housing is referred to as the outer side of the appliance. The communication module 140 can be attached to the household appliance 105 at any location to which a user conventionally has access, also, for example, on the inner side of the appliance door. However, it is preferable for the communication module 140 to be attached to the outside of the housing, so, as far as possible, it is not directly exposed to an operating process of the household appliance 105, in particular under the influence of water or heat.

In one embodiment an adapter 245 can be attached to the household appliance 105 and the communication module 140 can be attached to the adapter 245 when required. The adapter 245 can comprise, for example, a pocket or a different holding mechanism. The adapter 245 can be held on the household appliance 105 in any desired manner, for example by means of adhesive bonding, a hook-and-loop fastener, magnetically or by means of a screw. The communication module 140 can preferably be easily attached to or removed from the adapter 245.

At least one of the sensor devices 205 is designed to scan an emission signal which originates from a component of the household appliance 105 and carries out an operating process of the household appliance 105. Such a component can comprise, for example, a drive motor, a heater, a pump, a valve or a fan. A plurality of emission signals of the household appliance 105 are preferably evaluated by means of respectively associated sensor devices 205. Further sensor devices 205 can be provided to scan an environment or a region around the household appliance 105. For example, a sensor device 205 can comprise a vibration sensor, an acceleration sensor, a rotation rate sensor, an inclination sensor, a magnetic field sensor, a temperature sensor, an infrared sensor, a VOC sensor, an air humidity sensor, a water sensor, a camera or a microphone. The scanning behavior of the sensor device 205 can also be influenced. For example, a sensor device 205 embodied as a camera can be designed to be aligned in different directions, to record different image angles, to focus on different distances or to move in the region of the household appliance 105.

The processing device is designed, on the basis of measured values of the at least one sensor device 205, to determine an operating state of the household appliance 105. For this purpose, in particular measured values of a plurality of sensor devices 205 can be correlated with one another. The processing device 210 can provide the particular operating state to the outside by means of the wireless data interface 215, as described in greater detail above with reference to FIG. 1. However, unprocessed measured values can also be transmitted and processed further by a receiver.

To determine the operating state of the household appliance 105 it may be necessary to firstly determine the type of household appliance 105 in order to be able to meaningfully interpret emission signals of the household appliance 105. The type is conventionally specified by the purpose of the household appliance. Different types of household appliance include, for example, a washing machine 125, a dishwasher, a toaster, a coffee machine 120, a refrigerator 115, a cooker 110, or a vacuum cleaner.

In one embodiment the type of household appliance 105 can be input manually by means of the input device 230. In a further embodiment an indication of the type of household appliance can be attached to the adapter 245 or to the household appliance 105, for example in the form of an optically scannable pattern, which can be scanned by means of one of the sensor devices 205.

In a further embodiment it is preferred that information is stored in the storage device 225, which makes it possible to determine the type of household appliance 105 on the basis of the emissions scanned by means of the sensor devices 205. For example, different signatures can be stored for emissions of the washing machine 125 and of the coffee machine 120. The signatures can relate to one or more emission(s) and their temporal characteristics in predetermined operating states or comprise transitions between predetermined operating states. For example, the coffee machine 120, as a result of its operating noise, can have a characteristic odor which can be analyzed by the VOC sensor, or a moderate, locally limited heat emission during the preparation of coffee can be identified. The cooker 110 can be determined due to the fact that a magnetic field in its region indicates significant power consumption during operation or that a characteristic heat development can be observed at one or more predetermined burner(s). Other types of household appliance can be identified accordingly. The information or signatures stored in the storage device 225 can be selected such that they each stand for practically all household appliances 105 of the same type. Furthermore, emissions can be stored which make it possible to determine the type of household appliance 105 on the basis of emissions of only a part of its program sequence.

An operating state of a household appliance 105 can comprise a particular characteristic program section or an event during the course of the operating program. The operating state can in particular be identified by correlating measured values of a plurality of sensor devices 205. Some operating states of this kind shall be explained below by way of example.

Dishwasher

By means of the VOC sensor it can be checked whether the interior of the dishwasher meets hygienic standards. If dirty dishes remain in the dishwasher too long, food residues adhering to the dishes can spoil and an increased quantity of VOCs can be emitted. If this quantity exceeds a predetermined threshold value, an operating state can be determined which indicates that a cleaning process is required. A movement of the appliance door of the dishwasher can be detected by means of a kinetic sensor (for example vibration sensor, inclination sensor, acceleration sensor or rotation rate sensor). It is therefore possible to detect when the door is opened or closed and, if required, a corresponding message can be sent.

While the dishwasher is running the communication module 140 can determine the operating state based on data which has been scanned by means of one or more kinetic sensor(s). Progress of the cleaning program or an expected remaining time for the operating program can therefore be determined. A user can be notified when the dishwasher is switched on or off. If, for example, no vibrations are detected after a relatively long period of vibrations over several minutes, then the end of a rinsing process can be determined. If the door of the appliance is opened, the drying state of the dishes can be determined by means of the air humidity sensor or water sensor. The particular operating state can indicate whether the dishes have to be manually re-dried or are ready to be removed.

If there are irregularities during the program sequence then they can also be detected and evaluated by the communication module 140. A malfunction can be inferred if, for example, vibrations remain, which indicate operation of the dishwasher, over a relatively long period of time before the expected end of the program has occurred. A repair service or an operator can be notified accordingly.

Using measured values of a kinetic sensor or a microphone it is possible to determine when the dishwasher is adversely loaded, making cleaning more difficult. The vibration profile of the dishwasher can be changed due to the loading. A message which indicates disadvantageous loading can be stored or provided to a user.

Furthermore, the energy consumed by the dishwasher can be scanned during the program sequence and can be provided as a time characteristic or as a cumlative value. This information can, for example, be prepared graphically in order to be provided to a user, for instance via the mobile device 145, in a manner which is as meaningful and understandable as possible. In particular, the energy consumption can be correlated with the energy consumption of other household appliances 105, so it can quickly and easily be analyzed which household appliances 105 can be operated simultaneously and how, for example, a benefit can be gained from energy costs depending on the time of day.

Washing Machine 125 or Tumble Dryer

With the aid of the VOC sensor the communication module 140 can check whether the interior of the washing machine 125 meets hygienic requirements. If soiled laundry remains in the washing machine 125 for too long an odor can set in which can be analyzed by means of the VOC sensor. A user can be made aware that it is advisable to start a program of the washing machine 125 soon. In a corresponding manner it can be checked whether washed but still damp laundry has remained in the washing machine 125 too long, resulting in odors which can indicate a risk of mold spots. A movement of an appliance door can be monitored by means of a kinetic sensor device. A user can be informed, for example, when the appliance door is open or closed.

While an operating program of the washing machine 125 is running, the communication module 140 can track the operating state using magnetic emissions which can be emitted, for example, by a drive motor of the washing machine 125. Different sections of the operating program, for instance washing and spinning, can be distinguished on the basis of different specific magnetic emissions. An estimated remaining operating duration can then be determined.

The appliance door of the washing machine 125 can be magnetically closed during the program sequence. This closing process can be scanned by means of a magnetic field sensor. A water level in the washing machine 125 can be monitored through a transparent appliance door by means of a camera or a further optical sensor of the communication module 140. An end of the program sequence can be determined, for example, if no vibrations have occurred for a relatively long period of time, no water can be detected in the appliance drum and/or operating emissions have been scanned previously over a predetermined time. An appliance fault can be inferred if an irregularity in the operating sequence is detected. Servicing personnel can then be informed accordingly. As described above, energy consumption of the washing machine 125 can also be tracked here.

Cooker 110 or Oven

An operating state of the cooker 110 can be carried out using measured values of a temperature sensor or an infrared sensor. An oven temperature can be continuously provided, so a user can continuously monitor it. A notification can be sent if the oven temperature has reached a predetermined value. A further message can be sent if the cooker 110 is in operation for longer than a predetermined time. The risk of overboiling or burning food or a fire hazard can be reduced thereby.

A fire in the region of the cooker 110 can also be scanned by means of the temperature sensor or the infrared sensor. The fire can be determined using the temperatures reached or on the basis of the temperature development. In a further embodiment the communication module 140 can also determine boiling of a water-filled pot on the cooker 110. If an approximately uniform rise in temperature above the cooker 110, followed by a phase of constant temperature in the range of approximately 100° C. is detected, then boiling can be determined. A corresponding notification can then be sent. When the cooker 110 is switched off later, the communication module 140 can scan a cooling process on the oven 110.

Refrigerator 115 or Freezer

The quality or freshness of food in the refrigerator 115 can be monitored on the basis of measured values of the VOC sensor. If the measured values of the VOC sensor exceed a predetermined threshold value, for example due to an alcoholic fermentation process in the refrigerator 115, a message, which indicates imminent decay of food in the refrigerator 115, can be sent. In a further embodiment the thermal environment can be analyzed more accurately by means of the VOC sensor in order to find out which type of food is approaching its expiry date. A recipe, for example, can be added to a corresponding notification in order to consume the identified food.

The interior of the refrigerator 115 can be monitored by means of a camera. In this case, the camera can be moved, be pivoted in different directions or assume different viewing angles. Recordings of the interior can be archived for a predetermined time. Images can be recorded and stored or transmitted in a time-based or event-based manner. In one embodiment recording of an image can be triggered when the communication module 140 receives a corresponding request via the wireless interface 215. The request can be given by a user of the mobile device 145.

A state of the air in the refrigerator 115 can be monitored by means of the temperature sensor or air humidity sensor. The determined data can be transmitted or stored alone or in combination with the images of the camera. In one embodiment the determined temperature or humidity values are superimposed on recorded images. The user can be notified if the air quality is poor. A characteristic of the determined air quality over a predetermined time can be provided.

In addition, it can be monitored that a temperature, air humidity or a further value within the refrigerator 115 does not leave an associated predetermined region. Otherwise, a corresponding notification can be sent. A corresponding message can likewise be sent if a freezer compartment of the refrigerator 115 should become too hot or too much ice should be deposited. Opening or closing of a door of the refrigerator 115 can be detected, for example, by means of a kinetic sensor. The closed state of the door can be continuously provided and displayed to a user. A further notification can therefore be output if the door remains open longer than a predetermined time.

Coffee Machine 120

On the coffee machine 120 the communication module 140 can be used, for example, to monitor the freshness of coffee beans or ground coffee in a storage container of the coffee machine 120 by means of the VOC sensor. If the coffee has lost its flavor, a corresponding message can be output. Heating of the coffee machine 120 can be monitored by means of the temperature sensor or the infrared sensor. The user can be notified when the coffee machine 120 is sufficiently heated.

If the coffee machine 120 is put into operation then this can be determined by means of a kinetic sensor or the temperature sensor or infrared sensor. On the basis of this information the user can be informed when the prepared coffee has reached drinking temperature.

Space Monitoring

The communication module 140 can also be used to monitor a region respectively around one of the household appliances 105. For example, a laundry room or a kitchen can be monitored. In such a space, in which water is regularly used, it is not only possible to determine a water leak, which under some circumstances can be traced back to one of the household appliances 105, but also the risk of mold formation due to increased air humidity that lasts for a relatively long time. The air quality can be monitored by means of the air humidity sensor. If the relative humidity exceeds a predetermined value for a predetermined time, a notification can be output to the user so the user arranges for ventilation of the room.

Figure 3:
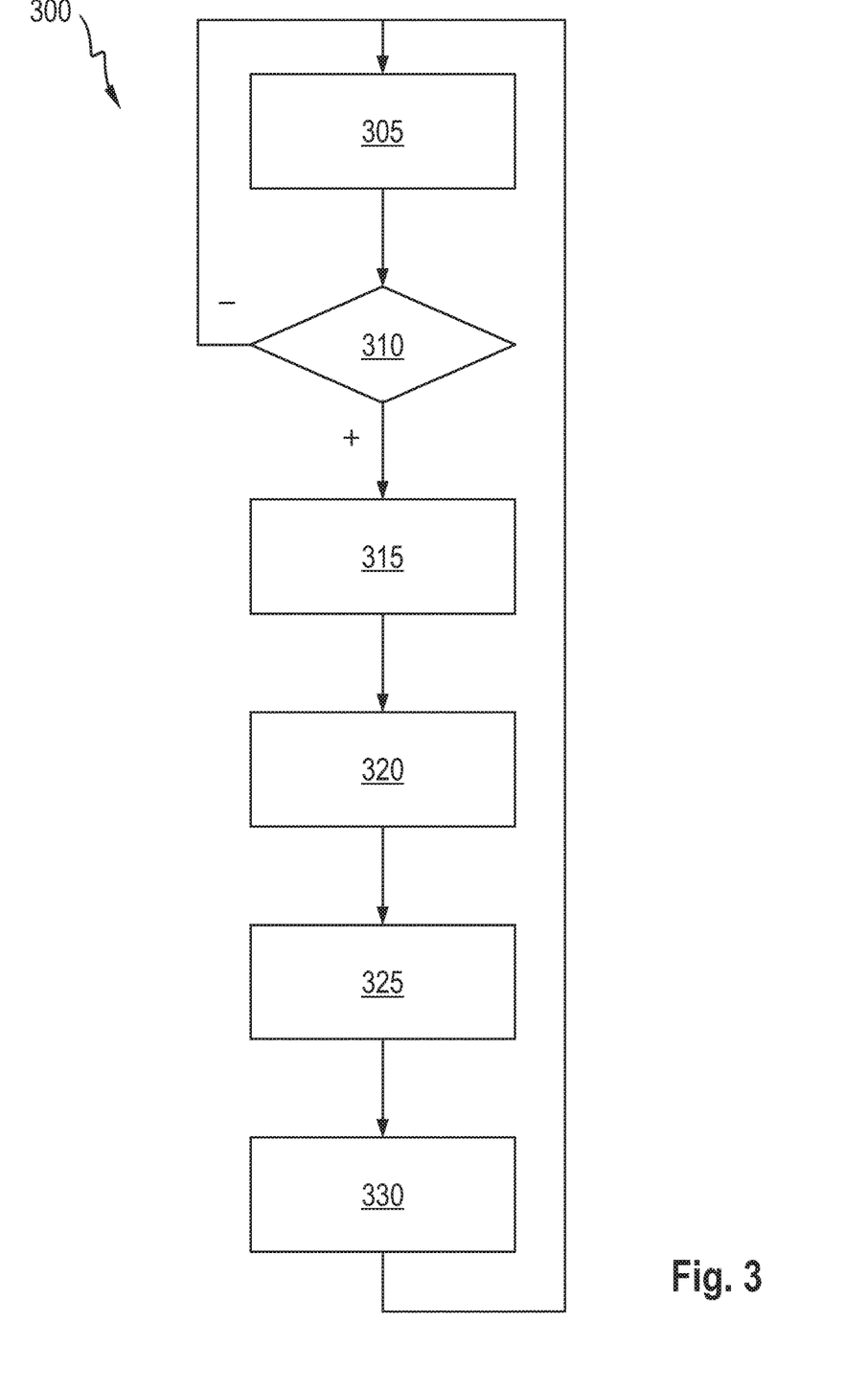
FIG. 3 shows a flowchart of a method for determining an operating state of a household appliance.

FIG. 3 shows a flowchart of a method 300 for determining an operating state of a household appliance 105. The method 300 is adapted in particular for running on the communication module 140. Parts of the method 300 can be carried out by means of the processing device 210 of the communication module 140, which can preferably be configured as a programmable microcomputer or microcontroller.

In one embodiment the method 300 begins with a step 305 in which a first sensor device 205 is scanned. Another sensor device 205, the processing device 210, the memory device 225 or the wireless data interface 215 can be switched off or operated in an energy-saving mode. In order to control scanning, the processing device 210 can be brought into an operating state at least for a short time. Scanning in step 305 preferably takes place in a time-controlled manner, for example approximately every 10 seconds or approximately every 10 minutes. This interval can be dependent on the previously determined type of household appliance 105.

In a step 310 a check is then made as to whether the scanned measured value indicates an emission which a component of the household appliance 105 conventionally emits during an operating process. It is therefore determined whether the household appliance 105 is active or not. If it is inactive, the method 300 can return to step 305 and run through again. Otherwise, if activity has been determined in step 310 or the described procedure for power saving is not followed, one or more further sensor device(s) 205 can be scanned in a step 315. Which of the sensor devices 205 are scanned can be determined according to the previously described type of household appliance 105.

If the type of household appliance 105 is not yet known, it can be determined in a step 320 on the basis of the previous scans. For this purpose, the scanned measured values, in particular in their history over a predetermined time, can be compared with information associated with known types of household appliance 105. This information can be stored in the memory device 225 of the communication module 140. In a step 325 an operating state of the household appliance 105 is determined on the basis of the scanned measured values. In this case, particular behavior patterns, program sections or combinations indicating a fault can be evaluated. A message can be sent to a user of the household appliance 105 as a function of a determination result.

The determined operating state can also be provided in a simple manner in a step 330 and, more precisely, either for retrieval on the communication module 140 itself or on a further device, in particular the central component 155 of FIG. 1. The method 300 can subsequently return to the start and run through again.

The explanations given with reference to the figures are to be understood as being purely illustrative and should not be understood as being restrictive. A large number of changes can be made to the described embodiments without departing from the scope of the invention as defined in the attached claims.

LIST OF REFERENCE NUMERALS

100 system
105 household appliance
110 cooker
115 refrigerator
120 coffee machine
125 washing machine
130 network component
135 network (internet)
140 communication module
145 mobile device
150 mobile radio network
155 central component (server)
160 data memory
205 sensor device
210 processing device
215 wireless data interface
220 energy store
225 memory device
230 input device
235 output device
240 fastening mechanism
245 adapter
300 method
305 scanning of first sensor
310 household appliance active?
315 scanning of further sensors
320 determination of appliance type
325 determination of operating state
330 provision of operating state

The invention claimed is:

1. A communication module for a household appliance, the communication module comprising:
   a sensor device configured for attachment in a region of a housing of the household appliance;
   said sensor device being configured to scan an emission signal, which passes through the housing to the outside, of a component of the household appliance carrying out an operating process of the household appliance;
   a further sensor device for scanning a further emission signal of the household appliance;
   a wireless data interface;
   a processor configured to determine an operating state of the household appliance based on measured values of said sensor device and said further sensor device, and to output the operating state by way of said data interface; and
   wherein the communication module is configured to be selectively used on different types of household appliances, the communication module being configured to shift the further sensor device of the communication module from a power-saving mode to an operating mode when the emission signal scanned by said sensor device indicates a change in the operating state of the household appliance.

2. The communication module according to claim 1, wherein said processor is configured to determine a type of the household appliance on a basis of the measured values of said sensor device.

3. The communication module according to claim 2, wherein predetermined emissions respectively are associated with a plurality of predetermined types of household appliances, and said processor is configured to compare measured values, which are scanned by way of said sensor device during operation of the household appliance, with predetermined emissions in order to determine on which type of household appliance the communication module is being used.

4. The communication module according to claim 1, wherein said further sensor device is configured to scan a region on an exterior of the housing of the household appliance for a measurable variable which is connected to the operating process of the household appliance.

5. The communication module according to claim 1, wherein said further sensor device comprises a VOC sensor.

6. The communication module according to claim 1, wherein said processor is configured to provide a progress of a program of the household appliance with respect to an expected program end.

7. The communication module according to claim 1, wherein the operating state comprises an energy consumption of the household appliance.

8. The communication module according to claim 1, wherein said processor is configured to send a notification when a predetermined operating state of the household appliance is reached.

9. A system, comprising:
a communication module according to claim 1; and
a mobile device having a wireless data interface for receiving the operating state of the household appliance from said communication module, wherein said mobile device is configured to output a warning if said mobile device is removed from a predetermined region of the household appliance while the household appliance is in operation.

10. A method for determining an operating state of a household appliance, the method comprising the following steps:
using a sensor device of a communication module for scanning an emission signal that passes through an appliance housing to an exterior of a component of the household appliance carrying out an operating process of the household appliance;
using a further sensor device of the communication module for scanning a further emission signal of the household appliance;
shifting the further sensor device of the communication module from a power-saving mode to an operating mode when the emission signal scanned by the sensor device indicates a change in the operating state;
determining a type of the household appliance on a basis of measured values of the sensor devices;
determining the operating state of the household appliance on the basis of measured values of the sensor devices and the type determined in the determining step; and
outputting the operating state thus determined.

* * * * *